(12) United States Patent
Perucci et al.

(10) Patent No.: US 12,118,979 B2
(45) Date of Patent: Oct. 15, 2024

(54) TEXT-TO-SPEECH SYNTHESIS SYSTEM AND METHOD

(71) Applicant: TELEPATHY LABS, INC., Tampa, FL (US)

(72) Inventors: Piero Perucci, Zurich (CH); Martin Reber, Zurich (CH); Vijeta Avijeet, Zurich (CH)

(73) Assignee: Telepathy Labs, Inc., Tampa, FL (US)

( * ) Notice: Subject to any disclaimer, the term of this patent is extended or adjusted under 35 U.S.C. 154(b) by 0 days.

(21) Appl. No.: 18/346,694

(22) Filed: Jul. 3, 2023

(65) Prior Publication Data

US 2023/0368775 A1 Nov. 16, 2023

Related U.S. Application Data

(63) Continuation of application No. 17/880,007, filed on Aug. 3, 2022, now Pat. No. 11,741,942, which is a continuation of application No. 17/041,822, filed as application No. PCT/US2019/024317 on Mar. 27, 2019, now Pat. No. 11,450,307.

(60) Provisional application No. 62/649,312, filed on Mar. 28, 2018.

(51) Int. Cl.
| | |
|---|---|
| *G10L 13/08* | (2013.01) |
| *G06N 3/08* | (2023.01) |
| *G10L 13/00* | (2006.01) |
| *G10L 13/047* | (2013.01) |
| *G10L 13/07* | (2013.01) |
| *G10L 25/51* | (2013.01) |

(52) U.S. Cl.
CPC .............. *G10L 13/047* (2013.01); *G06N 3/08* (2013.01); *G10L 13/08* (2013.01); *G10L 25/51* (2013.01)

(58) Field of Classification Search
CPC ......... G10L 13/08; G10L 17/26; G10L 13/00; G10L 15/00
See application file for complete search history.

(56) References Cited

U.S. PATENT DOCUMENTS

| | | | | |
|---|---|---|---|---|
| 4,624,012 A | * | 11/1986 | Lin | G10L 21/00 704/267 |
| 11,450,307 B2 | * | 9/2022 | Perucci | G10L 13/08 |
| 11,741,942 B2 | * | 8/2023 | Perucci | G10L 13/047 704/259 |

(Continued)

FOREIGN PATENT DOCUMENTS

| | | | | |
|---|---|---|---|---|
| JP | 5102365 B2 | * | 12/2012 | ............. G10L 25/78 |
| JP | 6268717 B2 | * | 1/2018 | ............. G10L 17/26 |

*Primary Examiner* — Shreyans A Patel
(74) *Attorney, Agent, or Firm* — Michael T. Abramsom; Jordan IP Law, LLC

(57) ABSTRACT

A method, computer program product, and computer system for text-to-speech synthesis is disclosed. Synthetic speech data for an input text may be generated. The synthetic speech data may be compared to recorded reference speech data corresponding to the input text. Based on, at least in part, the comparison of the synthetic speech data to the recorded reference speech data, at least one feature indicative of at least one difference between the synthetic speech data and the recorded reference speech data may be extracted. A speech gap filling model may be generated based on, at least in part, the at least one feature extracted. A speech output may be generated based on, at least in part, the speech gap filling model.

24 Claims, 9 Drawing Sheets

(56) References Cited

U.S. PATENT DOCUMENTS

| | | | | |
|---|---|---|---|---|
| 2001/0044721 A1* | 11/2001 | Yoshioka | ................ | G10L 19/18 |
| | | | | 704/E19.041 |
| 2003/0083878 A1* | 5/2003 | Lee | ........................ | G10L 13/07 |
| | | | | 704/266 |
| 2007/0016421 A1* | 1/2007 | Nurminen | ............... | G10L 13/08 |
| | | | | 704/260 |
| 2008/0243511 A1* | 10/2008 | Fujita | .................... | G10L 13/047 |
| | | | | 704/260 |
| 2011/0282668 A1* | 11/2011 | Stefan | ................... | G10L 13/033 |
| | | | | 704/266 |
| 2012/0166198 A1* | 6/2012 | Lin | ........................ | G10L 13/10 |
| | | | | 704/260 |
| 2013/0006630 A1* | 1/2013 | Hayakawa | .............. | G10L 17/26 |
| | | | | 704/239 |
| 2014/0257815 A1* | 9/2014 | Zhao | .................... | G10L 13/086 |
| | | | | 704/260 |
| 2017/0025115 A1* | 1/2017 | Tachibana | ........... | G10L 13/0335 |
| 2022/0375452 A1* | 11/2022 | Perucci | ................... | G10L 25/51 |

\* cited by examiner

TEXT-TO-SPEECH SYNTHESIS SYSTEM AND METHOD

RELATED CASES

This application is a continuation of U.S. patent application Ser. No. 17/880,007, filed 3 Aug. 2022, which is a continuation of U.S. patent application Ser. No. 17/041,822, filed 25 Sep. 2020, which is the U.S. national stage entry of PCT/US2019/024317, filed 27 Mar. 2019, which claims the benefit of U.S. Provisional Application No. 62/649,312, filed on 28 Mar. 2018, the contents of which are all incorporated by reference.

BACKGROUND

With the increase in power and resources of computer technology, building natural-sounding synthetic voices has progressed from an expert-system based approach to a data-driven approach. Rather than manually crafting each phonetic unit and its applicable contexts, high-quality synthetic voices may be built from sufficiently diverse single speaker databases of natural speech.

BRIEF SUMMARY OF DISCLOSURE

In one or more example embodiments, a text-to-speech synthesis system is disclosed. The text-to-speech synthesis system may include but is not limited to a speech engine, a processing unit and a neural network. In a training mode of the text-to-speech synthesis system, the speech engine may be configured to generate synthetic speech data for a first input text. Further, in the training mode, the processing unit may be configured to compare the synthetic speech data to recorded reference speech data corresponding to the first input text. The processing unit may be further configured to extract at least one feature indicative of at least one difference between the synthetic speech data and the recorded reference speech data based on the comparison of the synthetic speech data to the recorded reference speech data. Further, in the training mode, the neural network may be configured to train based on, at least in part, the at least one feature extracted. The neural network may also be configured to generate a speech gap filling model based on, at least in part, the training. In a synthesis mode of the text-to-speech synthesis system, the speech engine may be configured to generate speech output for a second input text based on, at least in part the speech gap filling model.

One or more of the following example features may be included. In the synthesis mode of the text-to-speech synthesis system, the speech engine may be configured to generate an interim set of parameters for the second input text. Further, in the synthesis mode, the processing unit may be configured to process the interim set of parameters based on, at least in part, the speech gap filling model to generate a final set of parameters. Further, in the synthesis mode, the speech engine may be further configured to generate the speech output for the second input text based on, at least in part, the final set of parameters. The text-to-speech synthesis system may be a parametric text-to-speech synthesis system. The synthetic speech data, as generated by the speech engine, may be based on, at least in part, at least one of a parametric acoustic model and a linguistic model pre-configured for a speaker. The synthetic speech data, as generated by the speech engine, may be further based on, at least in part, the recorded reference speech data pre-recorded by the speaker. In the training mode, the processing unit may be configured to align the synthetic speech data and the recorded reference speech data preceding the comparison. The processing unit may be configured to implement one or more of pitch shifting, time normalization, and time alignment between the synthetic speech data and the recorded reference speech data. The at least one feature extracted may include a sequence of excitation vectors corresponding to the at least one difference between the synthetic speech data and the recorded reference speech data for the first input text. In an update mode, the processing unit may be further configured to compare the speech output for the second input text to a recorded reference speech data corresponding to the second input text. The processing unit may further extract an updated at least one feature indicative of at least one difference between the speech output for the second input text and the recorded reference speech data corresponding to the second input text based on, at least in part, the comparison of the speech output for the second input text to the recorded reference speech data corresponding to the second input text. The neural network may be further configured to update based on, at least in part, the updated at least one feature extracted. The neural network may also be configured to update the speech gap filling model based on, at least in part, the training.

In another example embodiment, a text-to-speech synthesis method is disclosed. The text-to-speech synthesis method may include but is not limited to generating synthetic speech data for an input text. The text-to-speech synthesis method may further include comparing the synthetic speech data to recorded reference speech data corresponding to the input text. The text-to-speech synthesis method may further include extracting at least one feature indicative of at least one difference between the synthetic speech data and the recorded reference speech data based on, at least in part, the comparison of the synthetic speech data to the recorded reference speech data. The text-to-speech synthesis method may further include generating a speech gap filling model based on, at least in part, the at least one feature extracted. The text-to-speech synthesis method may further include generating a speech output based on, at least in part, the speech gap filling model.

One or more of the following example features may be included. Generating the speech output may include generating an interim set of parameters, processing the interim set of parameters based on, at least in part, the speech gap filling model to generate a final set of parameters, and generating the speech output based on, at least in part, the final set of parameters. The synthetic speech data generated may be based on, at least in part, at least one of a parametric acoustic model and a linguistic model pre-configured for a speaker. The synthetic speech data generated may be further based on, at least in part, the recorded reference speech data pre-recorded by a speaker. The text-to-speech synthesis method may further include aligning the synthetic speech data and the recorded reference speech data preceding the comparison. Aligning the synthetic speech data and the recorded reference speech data may include implementing one or more of pitch shifting, time normalization, and time alignment between the synthetic speech data and the recorded reference speech data. The text-to-speech synthesis method may further include training a neural network based on, at least in part, the at least one feature to generate the speech gap filling model. The text-to-speech synthesis method may further include comparing the speech output generated for a second input text to recorded reference speech data corresponding to the second input text, and extracting an updated at least one feature indicative of at least one difference between the speech output generated for the second input text and the recorded reference speech data corresponding to the second input text based on, at least in part, the comparison of the speech output for the second input text to the recorded reference speech data corresponding to the second input text. The text-to-speech synthesis method may further include updating the speech gap filling model based on, at least in part, the updated at least one feature.

In another example embodiment, a computer program product residing on a computer readable storage medium is disclosed. The computer readable storage medium may include a plurality of instructions stored thereon which, when executed across one or more processors, may cause at least a portion of the one or more processors to perform operations that may include but are not limited to generating synthetic speech data for an input text. The operations may include comparing the synthetic speech data to recorded reference speech data corresponding to the input text. Operations may further include extracting at least one feature indicative of at least one difference between the synthetic speech data and the recorded reference speech data based on, at least in part, the comparison of the synthetic speech data to the recorded reference speech data. A speech gap filling model may be generated based on, at least in part, the at least one feature extracted. Further, a speech output based on, at least in part, the speech gap filling model may be generated.

One or more of the following example features may be included. Generating the speech output may include generating an interim set of parameters, processing the interim set of parameters based on the speech gap filling model to generate a final set of parameters, and generating the speech output based on the final set of parameters. The generated synthetic speech data may be based on a parametric acoustic and linguistic model pre-configured for a speaker. The generated synthetic speech data may be further based on the recorded reference speech data pre-recorded by a speaker. The text-to-speech synthesis method may further include aligning the synthetic speech data and the recorded reference speech data preceding the comparison. Aligning the synthetic speech data and the recorded reference speech data may include implementing one or more of pitch shifting, time normalization, and time alignment between the synthetic speech data and the recorded reference speech data. The text-to-speech synthesis method may further include training a neural network based on the extracted features to generate the speech gap filling model. The text-to-speech synthesis method may further include comparing the generated speech output for a second input text to recorded reference speech data corresponding to the second input text, and extracting updated features indicative of differences between the generated speech output for the second input text and the recorded reference speech data corresponding to the second input text based on the comparison. The text-to-speech synthesis method may further include updating the speech gap filling model based on the extracted updated features.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
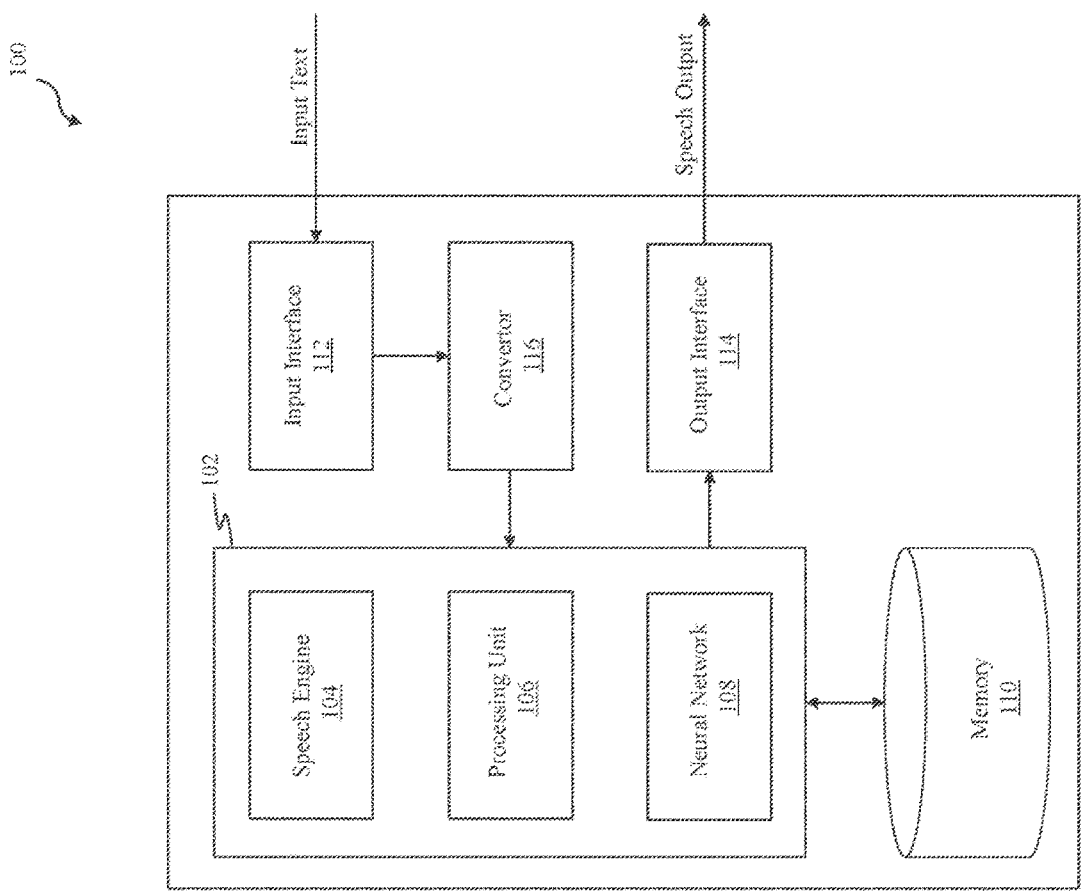
FIG. 1 is an example block diagram of a text-to-speech synthesis system, in accordance with one or more example embodiments of the present disclosure.

With the increase in power and resources of computer technology, building natural-sounding synthetic voices has progressed from an expert-system based approach to a data-driven approach. Rather than manually crafting each phonetic unit and its applicable contexts, high-quality synthetic voices may be built from sufficiently diverse single speaker databases of natural speech. Statistical parametric speech synthesis (SPSS) may be used for speech synthesis applications. A parametric text-to-speech (TTS) may model the evolution of speech signals. Parametric TTS typically use Hidden Markov Models (HMM), or closely related models, to create speech output. Various techniques may be used for HMM, including context-dependent modeling, state-tying based on decision tree clustering, and speaker adaptation. Generally, the generated speech parameter trajectory by an HMM-based parametric TTS tends to be fairly smooth.

Some systems may attempt to make efficient systems sound more like a human voice. For example, some systems may attempt to utilize a recurrent neural network (RNN) with bidirectional long short-term memory (LSTM) cells, multi-class learning algorithms for deep neural network (DNN), and F0 contour prediction with a deep belief network-Gaussian process hybrid model to improve quality of synthetic speech. With the introduction of neural network technology into speech recognition, TTS synthesis may be improved. Some neural networks may utilize deep machine learning processes.

In some cases, utilizing only HMM models may have problems. For example, due to the HMM models utilizing statistical averaging in its training, resulting synthesized speech tends not to sound as lively as desired (e.g., tends not to sound as close to natural speech). These deficiencies may be referred to as gaps in the speech (e.g., differences in properties between synthesized speech and natural speech that may include differences in pitch, amplitude, duration, etc. for individual sound segments).

Speech output quality from some parametric TTS synthesizers may be generally lower if compared with, e.g., unit selection synthesizers or some versions of neural network-based synthesizers. The speech output quality may be normally rated through listening tests carried out by human listeners that provide a numerical ranking between 1 and 5, called mean opinion score (MOS). The speech output quality for some parametric TTS synthesizers may be in the range from 2.5 to 3.5 MOS, while some unit selection synthesizers stand in the range between 3 and 3.8 MOS, and most neural network synthesizers may get up to 4 MOS.

High MOS values may come at the expense of a very large data footprint. Parametric synthesizers may still be valuable for their reduced footprint, which may make them suitable at least for mobile applications. For example, the parametric speech synthesis method may have relatively low requirements on the storage space and thus may be suitable for use in, for example, portable electronic devices. At least for that reason, it may be advantageous to find a way to increase the MOS produced by parametric TTS synthesizers.

Typically, the DNN may include multiple layers of non-linear operations. The DNN may simulate human speech production by a layered hierarchical structure to transform linguistic text information into final speech output. However, some current implementations of DNN are frequently not efficient for training or for the production of final speech output. Moreover, some current DNN implementations (e.g., end-to-end neural network) for TTS systems are unable to be implemented with parametric technology.

As will be discussed below, in some implementations, the present disclosure may include a system and method for improving perceived quality of speech output by providing a processing unit that, during a training mode, may compare synthetic speech data to recorded reference speech data and may extract features based on the comparison. In some implementations, during the training mode, the system and method may include a neural network that is trained based on the extracted features to generate a speech gap filling model. In some implementations, in a synthesis mode, the neural network may be implemented such that a speech engine is configured to generate speech output based on the generated speech gap filling model. The quality of the generated speech output may be improved and compared to other known synthesized speech at least because some properties of the generated speech output may more closely align or match with properties of recorded reference speech data (also referred to as natural speech). In other words, the system and method of the present disclosure may provide improvement to speech synthesis by better adjusting properties of speech (e.g., adjust pitch, amplitude, duration, etc.) such that these adjusted properties more closely align with the same properties of natural speech.

The method and system may provide several example and non-limiting advantages over some speech synthesis systems. One of the example advantages may include use of the speech gap filling model to fill in gap or differences between synthetic speech data and recorded reference speech data (natural speech). In some embodiments, the speech gap filling model may fill out difference(s) or adjust speech properties of synthesized speech to align more closely with properties of the recorded reference speech data (e.g., by filling in or adjusting speech properties such as pitch, amplitude, duration, etc. depending on differences). The method and system may provide several other example advantages, e.g., compensation for non-ideal behaviors in a parametric TTS. In some implementations, the present disclosure may also address vocoding and acoustic model limitations of the SPSS.

Further, other example features and example advantages offered by the present disclosure may, in some implementations, include:

Improving perceived quality of the synthetic signal by using the processing unit to perform comparison of synthetic speech data to recorded reference speech data.

Training a neural network (NN) to generate a speech gap filling model based on the extracted features that may be received from comparison of synthetic speech data to recorded speech data (e.g., NN used in SPSS to create speech gap filling model), and the speech gap filling model may be used by the processing unit to process and compensate an interim set of parameter(s) during synthesis mode in generating speech output.

By avoiding deterministic models (e.g., exemplar-based models for prosody reconstruction based on templates) and adopting NN approaches which may be architected to behave as stochastic models, may provide more lively behaviors than predefined sequences of models. For instance, a pitch contour, an amplitude contour, a duration pattern of individual sound segments, and a source signal itself, may be determined by the result of a stochastic process which would allow those features to vary across individual pitch periods (for voiced sounds) or across the duration of an unvoiced section. This variability may be determined by the context of the text to be synthesized in combination with the model parameters evolution over time, with the resulting speech sounding less static or predictable when compared to synthesized speech resulting from traditional techniques.

Improving SPSS behavior with respect to vocoding and accuracy of acoustic models by generating and using the gap filling model.

NN may use connectionist temporal classification (CTC) and long short-term memory (LSTM) systems as artificial neural network (ANN) technologies when generating gap filling model.

The training mode may include steps for aligning recorded reference speech data (e.g., natural speech) with synthetic speech, and during the same training mode, features may be extracted (as described above) where the extracted features may include a sequence of excitation vectors corresponding to difference between the synthetic speech data and the recorded reference speech data.

Forming, using vectors, a vector quantized space that may be built during training mode for modelling extracted features (difference signal) to generate speech gap filling model.

Using CTC and LSTM for training NN to be capable of predicting a best sequence of signal vectors (from the vector quantized space, so only indexes may be needed, and distances may be pre-calculated) given the context, to generate the speech gap filling model, which may be used during synthesis mode in generating speech output. This may contribute to improving vocoding speech output quality and reaching a potential high MOS (mean opinion score) for the generated speech output.

In an example, aspects of the present disclosure may utilize a NN solution for analyzing gaps/differences between parametric TTS output data and raw, original recording data. In a further example, a NN TTS system (e.g., NN SPSS system) may be used that has some predefined knowledge not typically available in other known NN-based TTS systems. In this example, the TTS system may decompose speech in a source filter. The TTS system may use a combination of two approaches resulting in a smaller NN. In another example, a neural network may be used for "filling gaps" of a synthetic signal with respect to a corresponding natural signal. The neural network has the task of raising the perceptual quality of the TTS system (e.g., SPSS system) by introducing, at synthesis stage, time modifications aimed at improving perceived vocoding quality.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The example implementation of FIG. 1 shows a schematic representation of a text-to-speech (TTS) synthesis system (generally designated by the numeral 100), in accordance with one or more embodiments of the present disclosure. Hereinafter, the TTS synthesis system is interchangeably referred to as "system 100", without any limitation. The system 100 of the present disclosure may be configured to convert input text into a synthesized speech output. According to an embodiment, the system 100 may be a parametric text-to-speech synthesis system. For example, the system 100 may be a statistical parametric text-to-speech synthesis system. Statistical parametric speech synthesis may be defined as a model-based technique, which may be capable of rapid adaptation and may require a relatively small amount of training data. In examples, statistical parametric text-to-speech synthesis systems may model speech using parameters, rather than stored exemplars; and may further model those parameters using statistics (e.g., means and variances of probability density functions) which may capture the distribution of parameter values found in the training data.

As shown in FIG. 1, the system 100, may primarily, include a speech generation unit 102 that may have a speech engine 104, a processing unit 106, and a neural network 108. The speech engine 104, the processing unit 106, and the neural network 108 may all be processing sub-systems, and, in one or more examples, may form part of a single processor in the system 100. In another example, the speech engine 104, the processing unit 106, and the neural network 108 may all be processing sub-systems, and, in one or more examples, may form part of multiple processors in the system 100. In one example, the speech engine 104 and the processing unit 106 may be isolated blocks or sub-systems. In another example, the processing unit 106 and the speech engine 104 may be combined as one sub-system or combined as a layered sub-system (e.g., the speech engine 104 may be on one layer and the processing unit 106 may be on a second layer, and routines of the speech engine 104 may be called from routines of the processing unit 106 or vice versa). Further, the speech engine 104 and the processing unit 106 may be connected or joined in a layered software architecture. The system 100 may further include a memory 110 provided in communication with the speech generation unit 102. The system 100 may also include an input interface 112 and an output interface 114. In addition, the system 100 may include a convertor 116 that converts input text into a symbolic linguistic representation for processing by the speech engine 104. In some examples, the system 100 may also include an encoder/decoder that may, for example, encode and/or compress the audio speech output, as generated, prior to transmission. It may be contemplated that other non-illustrated components may also be included. Also, some of the shown components may not be present in every device capable of employing aspects of the present disclosure. Further, some components that are shown in the system 100 as a single component may also appear multiple times in a single device. Those skilled in the art will appreciate that the principles of the present disclosure may be implemented with any suitable arrangement of the above-mentioned components in the system 100.

In one or more examples, each of the speech engine 104, the processing unit 106, and the neural network 108 may be embodied as a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as those noted above. In some implementations, the neural network 108 may be a deep learning neutral network (DNN). Further, the memory 110 may include one or more non-transitory computer-readable storage media that may be read or accessed by other components in the system 100. The memory 110 may be any computer-readable storage media, such as those noted above, which can be integrated in whole or in part with the system 100. In some examples, the memory 110 may be implemented using a single physical device (e.g., one optical, magnetic, organic or other memory or storage unit), while in other embodiments, the memory 110 may be implemented using two or more physical devices. In one or more examples, the entire system 100 may run on hardware and FPGA as well as may use synthesized very high speed integrated circuit (VHSIC) hardware description language (VHDL) logic.

The input interface 112 may be configured to receive input text. The input interface 112 may be, for example, a keyboard or a keypad of a computing device, such as a portable computing device (e.g., a PDA, smartphone, etc.). Alternatively, the input interface 112 may be a means for receiving text data from a file stored on one or another form of computer readable storage medium, or from an external storage medium or from a network. The input text may be written text, such as one or more written sentences or text strings, for example. The input text may also take the form of other symbolic representations, such as a speech synthesis mark-up language, which may include information indicative of speaker emotion, speaker gender, speaker identification, as well as speaking styles. Similarly, the output interface 114 may be configured for outputting synthesized speech output processed by the system 100 or by another device. The output interface 114 may include a speaker, headphones, or other suitable component for emitting sound.

The interfaces 112, 114 may also include an interface for an external peripheral device connection such as universal serial bus (USB), FireWire™, Thunderbolt™, or other connection protocol. The interfaces 112, 114 may also include a network connection such as an Ethernet port, modem, etc. The interfaces 112, 114 may also include a wireless communication device, such as radio frequency (RF), infrared, Bluetooth®, wireless local area network (WLAN) (such as Wi-Fi®), or wireless network radio, such as a radio capable of communicating with a wireless communication network such as a Long Term Evolution (LTE™) network, WiMAX network, 3G network, etc.

In the system, the input text, via the input interface 112, may be received by the convertor 116 for optional linguistic analysis. The output of the convertor 116, referred to as a symbolic linguistic representation, may include a sequence of phonetic units annotated with prosodic characteristics. The received input text (or the corresponding symbolic linguistic representation) may be transmitted to the speech engine 104, in the speech generation unit 102, for conversion to synthetic speech data.

The speech engine 104 may perform speech synthesis using one or more different methods. In some embodiments, the speech engine 104 may implement a parametric acoustic and linguistic model for converting an input text into synthetic speech data (e.g., this may include any internal representation of speech data including intermediate results processed in the speech engine 104, such as a pronunciation set of rules, a vocal tract model set of parameters, specific source parameters, a spectral representation of the overall source and vocal tract model, etc.). In one example, the synthetic speech data may be predicted by a baseline parametric TTS. In one or more examples, the parametric acoustic and linguistic model may be a Hidden Markov Model (HMM), or specifically a closely related variant which is generally referred to as a Hidden Semi-Markov Model (HSMM).

In general, the parametric acoustic and linguistic model may implement various techniques to match a symbolic linguistic representation, from an input text, with desired output speech parameters. The parametric acoustic and linguistic model may provide rules which may be used by the speech engine 104 to assign specific audio waveform parameters to input phonetic units and/or prosodic annotations. The rules may be used to calculate a score representing a likelihood that a particular audio output parameter(s) (such as frequency, volume, etc.) corresponds to the portion of the input text. Such parametric acoustic and linguistic models may be appreciated by one of skill in the art.

It may be understood that the parametric acoustic and linguistic model may be pre-configured for a speaker. For this purpose, the parametric acoustic and linguistic model may be generated by using recorded reference speech data from the speaker. The recorded reference speech data may be, for example, data created and associated with an original speech data waveform as pronounced by a speaker. The recorded reference speech data may include parameters (such as pitch, duration, amplitude and spectral evolution) of a predefined sentence derived across time. In other words, the recorded reference speech data from the speaker may be used to train the parameters of the parametric acoustic and linguistic model. In one or more examples, the recorded speech data may be generated using a communication device, which uses recorded voice signals of the individual speaker along with a text record of the words being spoken in the voice signals. For practical reasons, the speech samples may usually be recorded, although they need not be in principle. In general, the corresponding text strings may be in, or generally accommodate, a written storage format. In the system 100, the recorded reference speech data and their corresponding text strings may be stored in the memory 110 for later retrieval. As noted earlier, the parametric acoustic and linguistic model may be trained using the recorded reference speech data consisting mainly of numerous speech samples from the speaker and corresponding text strings (or other symbolic renderings). It may be contemplated that the parametric acoustic and linguistic model may be either trained by the system 100 itself by analyzing the recorded reference speech data and their corresponding text strings, or may be trained by an external system and loaded onto the present system 100. In some examples, the parametric acoustic and linguistic model may generally correspond to an individual speaker; however, in other examples, the system 100 may store separate parametric acoustic and linguistic models for more than one speaker, without any limitations.

The system 100 of the present disclosure may improve the perceived speech output quality as generated by the speech engine 104 by, e.g., using the processing unit 106 to compensate for non-ideal behaviors in the synthetic speech output from the speech engine 104. The working of the system 100 for generating a speech output for an input text may be generally divided into two stages or modes, namely a training mode and a synthesis mode (e.g., test/production mode), as will be discussed further below.

Figure 2:
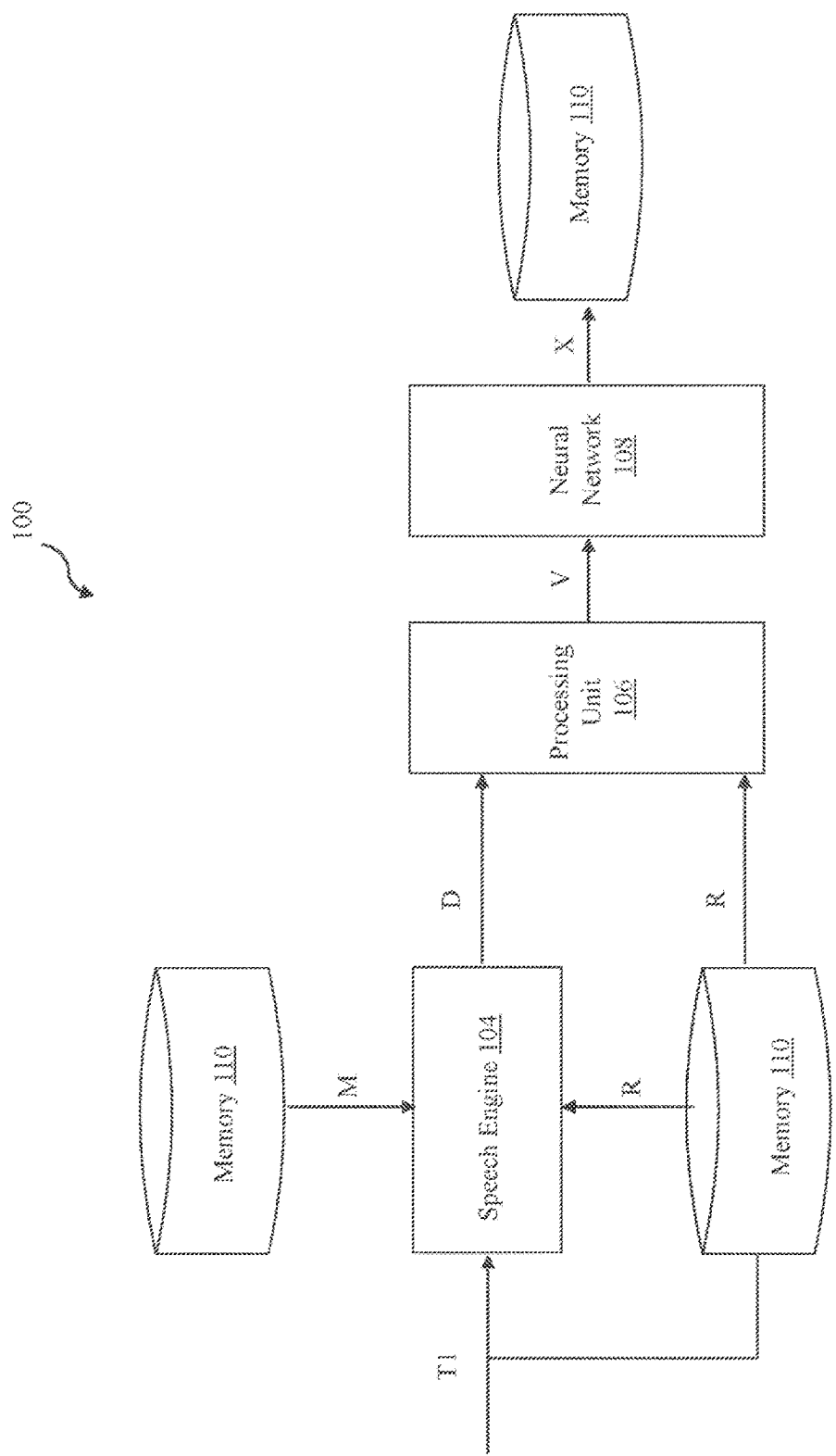
FIG. 2 is an example block diagram of a text-to-speech synthesis system being implemented in a training mode, in accordance with one or more example embodiments of the present disclosure.

With reference to the example implementation of FIG. 2 in connection with FIG. 1, a schematic representation of the system 100 in the training mode is shown. In the training mode, the input interface 112 may be configured to receive a first input text 'T1'. In one or more examples, the first input text 'T1' may be designed for training of the system 100. The first input text 'T1' may have been processed by the convertor 116 into symbolic linguistic representation for processing by the speech generation unit 102. In the speech generation unit 102, the first input text 'T1' (or, the corresponding symbolic linguistic representation) may be processed by the speech engine 104 (e.g., parametric TTS engine) to generate synthetic speech data 'D' for the first input text 'T1'. In one or more embodiments, the speech engine 104 may implement parametric acoustic and linguistic model 'M', which may be pre-configured for the speaker, for generating the synthetic speech data 'D'. In some embodiments, the speech engine 104 may also further utilize the recorded reference speech data 'R' which may be pre-recorded by the same speaker, for generating the synthetic speech data 'D' for the first input text 'T1'. For example, the speech engine 104 may generate an internal parameter stream based on the first input text 'T1' and the parametric acoustic and linguistic model 'M', then the speech engine 104 may calculate an alignment in time between the internal parameter stream and the recorded reference speech data 'R', and the speech engine 104 may produce the synthetic speech data 'D' based on the calculated alignment (e.g., pitch shifting, time normalization, and time alignment between the synthetic speech data and the recorded reference speech data such as adjusting properties of speech, e.g., adjust pitch, amplitude, duration, being that the alignment may be based on matching a phonetic start-end point(s) as found in the recorded reference speech and in the generated synthetic speech output, etc., such that these adjusted properties more closely align with the same properties of recorded reference speech data). Further, the speech engine 104 may produce the synthetic speech data 'D', for example, by operating time domain distortion of the internal parameter stream to be aligned to the reference stream. The speech engine 104 may obtain the parametric acoustic and linguistic model 'M' along with the recorded reference speech data 'R' from memory 110 (e.g., single physical memory device, or two or more physical devices). In an example, the parametric acoustic and linguistic model 'M' may be stored in a first memory 110 and the recorded reference speech data 'R' may be stored in a second memory 110. As shown in FIG. 2, the memory 110 may receive the first input text 'T1' that was received at the input interface 112. The first input text 'T1' may be used by the memory 110 to retrieve the appropriate recorded reference speech data 'R' for the first input text 'T1'. The recorded reference speech data and their corresponding text strings may be stored in the memory 110 for later retrieval. The recorded reference speech data may be, for example, data created and associated with an original speech data waveform as pronounced by a speaker. The recorded reference speech data may include derived parameters such as pitch, duration, amplitude, and spectral evolution of the original sentence across time. The reference speech data may include information associated to phonetic segments, such as start-end points for each phoneme spoken in the sentence. Pitch information may be derived from recorded reference speech signal data, using, e.g. an auto-correlation method, that may determine a maximum of the autocorrelation of the signal at a certain time lag. Amplitude information may be obtained summing up an absolute value of the signal across a predefined length (e.g., 5 msec), and may normalize it by the number of samples. Duration information may be directly derived from the phonetic information described above, e.g., by subtracting an end pointer to the start pointer, giving the duration in samples, and may normalize with respect to the sampling frequency to obtain the duration in milliseconds. Once a parameter track is obtained, it may derived by a per-phoneme parameter representation, corresponding to the parameter track at the beginning, in the middle, and at the end of the phoneme. This "phonetically anchored" INITIAL-MID-END partitioning of the parameters, may be useful for building the parametric baseline models, and for building and using the gap filling model as well.

In an example, the parametric acoustic and linguistic model 'M' may be generated by employing a speaker to provide the speaker's voice pronouncing a set of predefined written sentences in a speaker database. The speaker voice may be stored as a recording which may be generated as a corresponding signal or signals. The predefined written sentences may be stored as corresponding texts (e.g., texts presented to speaker). The pronunciation (e.g., in phonetic alphabet) may be derived automatically by known rules, for example, vocal tract parameters may be derived automatically by signal processing tools, e.g., Mel Frequency Cepstral Coefficient (MFCC) or others. Pitch and source parameters may be derived automatically by signal processing tools, e.g., Iterative Adaptive Inverse Filtering (IAIF) or others. Then, phonetic label alignment may be applied. In an example, the phonetic label alignment may include a preliminary HMM model as being built from the pronunciation of text of each sentence and may be optimized through an algorithm (e.g., Viterbi algorithm) to form individual context dependent phoneme models (with multiple states). Such an optimal model may produce the desired phoneme to signal alignment. This may allow automatic enrichment of the speaker database with a set of features suitable for further processing, such as phoneme durations in context, phonemes initial medial and final pitch in context, etc. A language model may be applied. In an example, the language model may use techniques such as Classification and Regression Trees (CART) where a number of trees may be built to predict parameters or features for unseen text. For example, such trees may predict, e.g., the phonetic transcription of the input text, duration of each phoneme in context, target pitch (initial, medial and final) for each phoneme in context, and the like. It may be understood that for each predictor, the language model may be represented by one tree. An acoustic model may be applied. In an example case of using HMM, a technique similar to the one defined above for language model CART may be used to predict the optimal sequence of cepstral parameters to feed a vocoder for generating speech or sound (e.g., where sequence of parameters may be generated and depended phoneme models may be created). This may result in a single tree with each leaf corresponding to a vector of cepstral parameters. In some implementations, indices may be used as leaf values instead of the actual parameters, given that a proper clustering may be done of the entire parameter space beforehand. It shall be appreciated that there could be many variations of this scheme for generating the parametric acoustic and linguistic model, and such variations are incorporated within the scope of the present disclosure. As an example, the combination of the linguistic and acoustic models may be combined to produce the overall model M into a single tree, as described above.

In some implementations, in the training mode, the processing unit 106 may be configured to compare the synthetic speech data 'D' to the recorded reference speech data 'R' corresponding to the first input text 'T1'. For this example purpose, in an embodiment, the processing unit 106 may be configured to align the synthetic speech data 'D' and the recorded reference speech data 'R' preceding the comparison. That is, the processing unit 106 may align the synthetic speech for the first input text 'T1' as predicted by the baseline parametric TTS with natural speech as recorded by the speaker for the first input text 'T1'. Transformations to signals generated may include, but are not limited to, adding or subtracting to signals. For example, the processing unit 106 may achieve the alignment by implementing one or more of pitch shifting, time normalization, and time alignment between the synthetic speech data 'D' and the recorded reference speech data 'R'. This may assist in fitting synthetic signals to the signal coming from natural utterances before using it for training the neural network 108 (or otherwise).

The processing unit 106 may be further configured to extract one or more features 'V' indicative of one or more differences between the synthetic speech data 'D' and the recorded reference speech data 'R' based on the comparison. In some embodiments, extracted features 'V' may be based on differences in speech properties such as differences in pitch, amplitude, duration, etc. between synthetic speech data and recorded reference speech data. The synthetic speech data 'D' and reference speech data 'R' (e.g., natural speech) may be aligned in time for facilitating with a feature extraction step or steps. These extracted features 'V' may include, but are not limited to, Fundamental Frequency (F0), LF (Liljencrants-Fant model) features representing the source signal (e.g., vocal folds' behavior), parametric representation of the spectrum (such as Cepstral Coefficients), linguistic features representing the context, linguistic features related to the context, and a difference signal between the recorded reference speech and synthesized speech. In an example, the difference signal that may be modeled is a source signal, and not the parameter space. This difference signal may be modeled in a space of vector quantized excitation vectors that may be built in the training mode. In an example embodiment, where the system 100 is the parametric text-to-speech synthesis system, the extracted features 'V' may particularly include a sequence of excitation vectors, corresponding to the differences between the synthetic speech data 'D' (e.g., SPSS) and the recorded reference speech data 'R' (e.g., natural speech signal), for the first input text 'T1'.

In some implementations, in the training mode, the neural network 108 may be implemented to be trained based on the extracted features 'V'. The neural network 108 may be trained in a supervised mode based on the extracted features 'V'. For example, the extracted features 'V' may be inputs for the neural network 108 in the training mode. The training of the neural network 108 may be conducted with all input texts available in the memory 110 in order to improve the generalization capability of the neural network 108 and reduce the risk of overfitting due to sparse characterization of phonetic contexts. In one or more examples, the neural network 108 may implement connectionist temporal classification (CTC) which is a family of techniques to perform classification tasks on a sequence of events. It may be understood that speech is a typical domain in which before identifying a segment of sound to be, for instance, belonging to a class such as a vowel or a consonant, one may need to observe a sequence of samples or as sequence of features extracted from speech (e.g., energy, pitch, spectrum). CTC may play a role in performing labeling of unsegmented sequence data such as determining the classes to be aligned, directly from data without any prior knowledge of the classes. Further, in one or more examples, the neural network 108 may be configured using long short term memory (LSTM). LSTM is a particular type of a recurrent artificial neural network component that may capable of modeling time dependencies of a sequence, being it handwritten text, genomes, spoken words, or time series from sensors, etc. By implementing LSTM, the neural network 108 may be capable of reducing potential gradient explosion/vanishing problems by modeling explicitly the capability to remember something (forget gate), to learn from new input (input gate), and/or to feed output to close neurons (output gate). In one example, the LSTM may be used to help configure basic elements of the neural network 108.

In an embodiment of the present disclosure, the neural network 108 may be configured to generate a speech gap filling model 'X' based on extracted features (which may be based on differences in speech properties between synthetic speech data and recorded reference speech data) in the training mode. For example, the gap filling model 'X' may be created by feeding a neural network with inputs corresponding to part of the phonetic sequence of a sentence to be used for training, and other inputs corresponding to the parameters resulting from the parametric synthesizer when exercised through the same phonetic sequence. A number of connected layers may be inserted between the input layer and an output layer, which brings the difference between the parameters (e.g., predicted by a parametric synthesizer) and the same parameters may be found in the reference speech data. In practice, the network may be trained using the difference between the synthetic speech data (e.g., parametric sequence) and the reference speech data (e.g., reference sequence), this difference being provided as "ground truth" output during the training phase. Further, the speech gap filling model 'X' may be generated based on differences in speech properties (e.g., differences in pitch, amplitude, duration, source or spectral parameters, etc.) between synthetic speech data and recorded reference speech data. The speech gap filing model 'X' may be a representation of required changes that may be incorporated into an original internal parameter stream that may be generated by the speech engine 104 before sending the internal parameter stream to a final waveform generation step (e.g., example changes may include duration adjustments or pitch adjustments or source parameters adjustments given the phonetic context of segments to be synthesized). It may be understood that the speech gap filling model 'X' may be an extension of the parametric acoustic and linguistic model 'M'. In the system 100, the generated speech gap filling model 'X' may be stored in the memory 110 for later retrieval. In an example, this memory 110 may be the same single memory 110 that also stores the parametric acoustic and linguistic model 'M' and the recorded reference speech data 'R'. In another example, the memory 110 may be one of two or more memory 110 devices that store the generated speech gap filling model 'X', the parametric acoustic and linguistic model 'M', and the recorded reference speech data 'R'.

Figure 3:
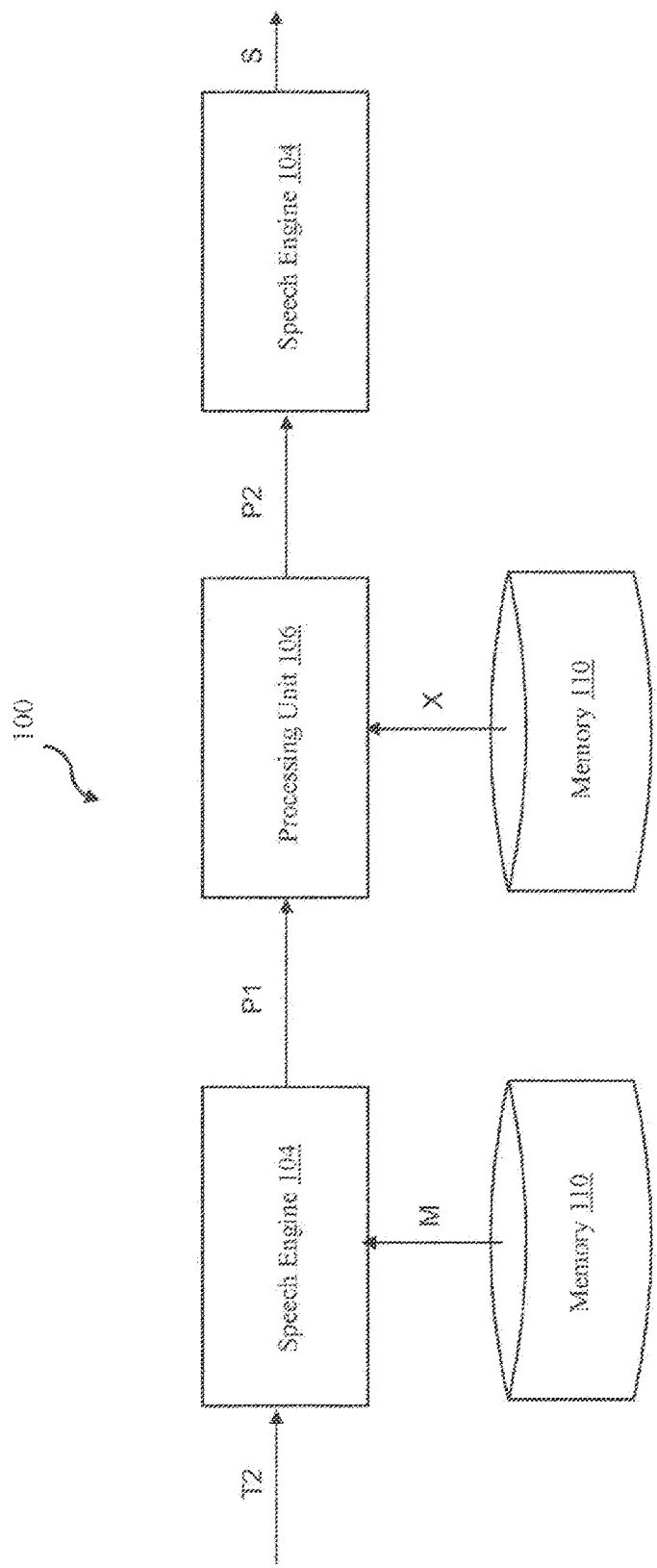
FIG. 3 is an example block diagram of a text-to-speech synthesis system being implemented in a synthesis mode, in accordance with one or more example embodiments of the present disclosure.

With reference to the example implementation of FIG. 3 in connection with FIG. 1, a schematic representation of the system 100 in the synthesis mode is shown. In the synthesis mode, the input interface 112 may be configured to receive a second input text 'T2' (e.g., as provided by a user). The second input text 'T2' may be any input text provided by the user during synthesis mode. The second input text 'T2' may be the same text as used in training mode (e.g., same text as the first input text 'T1') or it may be different text as used in training mode (e.g., different text from the first input text 'T1'). As noted earlier, the second input text 'T2' may have been processed by the convertor 116 into symbolic linguistic representation for processing by the speech generation unit 102. In the speech generation unit 102, the second input text 'T2' (or, the corresponding symbolic linguistic representation) may be processed by the speech engine 104 to generate an interim set of parameters 'P1' for the second input text 'T2'. As may be understood, the speech engine 104 may implement the parametric acoustic and linguistic model 'M' (from the memory 110) for generating the interim set of parameters 'P1'. The interim set of parameters 'P1' may be, for example, the entire set of phonetic identifiers of corresponding sentence, and per each phoneme the value of the amplitude and pitch at the beginning, middle and ending portions of each phoneme. Other parameters may be related for instance to a vocal fold usage, e.g. LF model, may be considered part of the interim set of parameters 'P1', in some embodiments. In one example, the interim set of parameters 'P1' (e.g., internal parameter stream that may be generated and derived by the speech engine 104 based on the second input text 'T2' and the parametric acoustic and linguistic model 'M') may correspond to synthetic speech data, as generated by the speech engine 104, without the audio waveform information or the like.

Further, in the synthesis mode, the processing unit 106 may be configured to process the interim set of parameters 'P1' based on the speech gap filling model 'X' (as stored in the memory 110) to generate a final set of parameters 'P2' (e.g., may use speech gap filling model 'X' to adjust speech properties—e.g., pitch, amplitude, duration, etc.—of interim set of parameters 'P1' to align closer to recorded reference speech data resulting in final set of parameters 'P2' such that the final set of parameters 'P2' may be a result of adjustments to the speech properties of the interim set of parameters 'P1'). During the synthesis mode, the relevant text (e.g., second input text 'T2') may be analyzed and dissected into a sequence of phonetic symbols, and for each phoneme the values of the parameters associated with pitch, amplitude, duration and other source related parameters may be fed to a neural network that will give, at its output, the difference to apply to each parameter of the interim set of parameters 'P1' representation, in order to become the final set of "adjusted" parameters 'P2'. The information of pitch, amplitude, duration (and source) parameters may be associated with each phoneme as found in the final set of parameters 'P2' representation and may be finally used to synthesize the actual waveform. According to some embodiments, there may be a dedicated neural network (e.g., having the speech gap filling model 'X') per each parameter, or a neural network capable of handling a combination of parameters that may model the differences of all parameters together in one process. The convenience of having split or combined neural networks may be determined by the amount of available memory at runtime. As appreciated by one of skill in the art, other possible configurations may be used. The final set of parameters 'P2' may include information related to signal vectors (e.g., from the vector quantized space of the speech gap filling model 'X') applicable for the second input text 'T2'. Further, in the synthesis mode, the speech engine 104 may act as a decoder and may be configured to generate the speech output 'S' for the second input text 'T2' based on the final set of parameters 'P2'.

In FIG. 3, the speech engine 104 may function in two roles or settings during synthesis mode. As described above, in one role or setting, the speech engine 104 may generate an interim set of parameters 'P1' for the second input text 'T2' and in another role or setting, the speech engine 104 may generate the speech output 'S' for the second input text 'T2' based on the final set of parameters 'P2'. Further, the speech engine 104 may be described as functioning in a feedback loop with the processing unit 106 (e.g., speech engine 104 may send interim set of parameters 'P1' to the processing unit 106 and then the processing unit 106 may send final set of parameters 'P2' back to speech engine 104). The speech engine 104 may send speech output 'S' to the output interface 114 to generate an audio waveform (to be outputted by an audio-speaker or the like) as the synthesized speech. In some examples, the speech output 'S' may also be stored in the memory 110 for later retrieval and training purposes (as discussed below).

Figure 4:
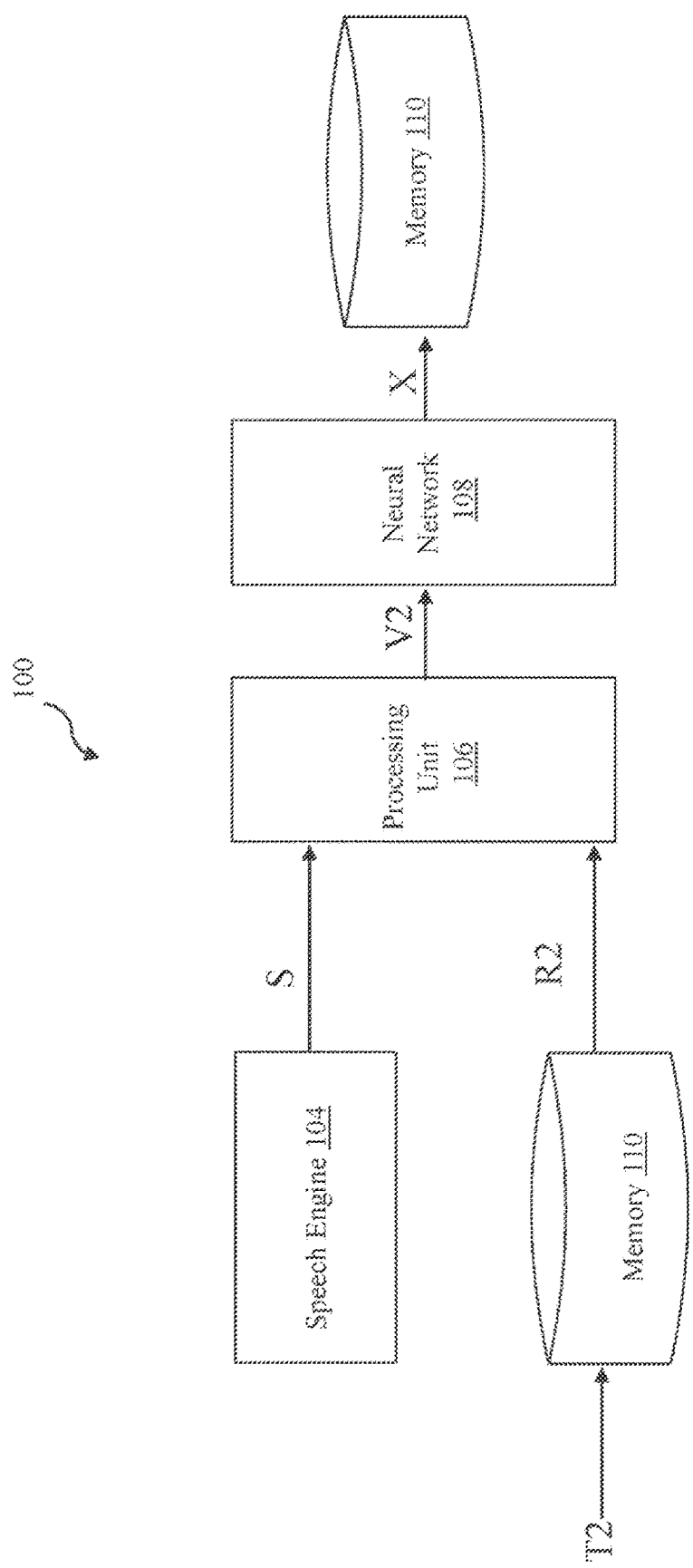
FIG. 4 is an example block diagram of a text-to-speech synthesis system being implemented in an update mode, in accordance with one or more example embodiments of the present disclosure.

With reference to the example implementation of FIG. 4 in connection with FIG. 1, a schematic representation of the system 100 in an update mode is shown. In some examples, the neural network 108 may be incrementally updated to further improve the generated speech gap filling model 'X'. In such example, the system 100 may be disposed in an update mode. In such an update mode, the processing unit 106 may be configured to compare the generated speech output 'S' for the second input text 'T2' (from the speech engine 104) to recorded reference speech data 'R2' corresponding to the second input text 'T2', provided that the recorded reference speech data 'R2' for the second input text 'T2' has been recorded by the speaker and may be available in the memory 110. As shown in FIG. 4 and similarly described above with respect to the first input text 'T1' in FIG. 2, the memory 110 may also receive the second input text 'T2' that was received at the input interface 112. The second input text 'T2' may be used by the memory 110 to retrieve the appropriate recorded reference speech data 'R' for the second input text 'T2'. As described above, the recorded reference speech data and their corresponding text strings may be stored in the memory 110 (or elsewhere) for later retrieval.

In some implementations, during the update mode, the processing unit 106 may be configured to extract updated features 'V2' indicative of differences between the generated speech output 'S' for the second input text 'T2' and the recorded reference speech data 'R' corresponding to the second input text 'T2' based on the comparison. In some examples, during the update mode, several passes of feature extraction may be considered. It may be understood that any speech data that may be generated in such incremental update mode may be discarded when the resulting speech output quality increment may be negligible based on some predefined threshold. Subsequently, the neural network 108 may be implemented to update based on the extracted updated features 'V2'. Further, similarly as discussed above, the neural network 108 may be configured to update the speech gap filling model 'X' based on the extracted updated features 'V2' (e.g., subsequent application of a "gap filling" neural network 108 may generate an updated improved parameter stream that may update the speech gap filling model 'X').

In some example implementations, the system 100 may re-run the synthesis mode (as shown in FIG. 3) with the updated speech gap filling model 'X' to produce an improved generated speech output 'S'. For example, during the synthesis mode, the processing unit 106 may process the interim set of parameters 'P1' based on the updated speech gap filling model 'X' to generate an improved final set of parameters 'P2' (e.g., improved parameter stream). The improved final set of parameters 'P2' may include updated information related to signal vectors (e.g., from the vector quantized space of the updated speech gap filling model 'X'). The improved final set of parameters 'P2' (e.g., improved parameter stream) may be sent by the processing unit 106 to the speech engine 104. The speech engine 104 may act as a decoder and may be configured to generate improved speech output 'S' based on the improved final set of parameters 'P2' (e.g., the improved parameter stream may be used in a mode called "decoder mode" in which the speech engine 104 may ignore text inputs or other variables but may use the improved parameter stream to produce improved generated speech output 'S').

The incremental update mode of FIG. 4 is similar to the training update mode of FIG. 2, with the difference being that the speech engine 104 may output generated speech output 'S' to the processing unit 106 instead of the synthetic speech data 'D' and the speech engine 104 may have no inputs (e.g., the speech engine 104 may not receive or use any input text ('T1' or 'T2'), acoustic and linguistic model 'M', or any recorded reference speech data 'R', 'R2'). Further, for the incremental update mode, memory 110 may output the recorded reference speech data 'R2' corresponding to the second input text 'T2' instead of the recorded reference speech data 'R' corresponding to the first input text 'T1'.

Further, it may be appreciated that, in some examples, the comparison may be cycled more than once during training mode or update mode. In these examples, the output of the neural network 108 may be conceptually compared again to the recording (e.g., raw, original recording) with results being provided back into the neural network 108 for the differences to be analyzed.

Further, in some examples, the system 100 may utilize multiple generated speech outputs 'S' (e.g., multiple parametric TTS outputs) in the comparison with the corresponding recorded reference speech data 'R' (e.g., raw, original signal). Such update processes may be iteratively repeated and incremental for all of the input texts available in the memory 110 with corresponding recorded reference speech data to improve the speech gap filling model 'X' with each update step.

Figure 5A:
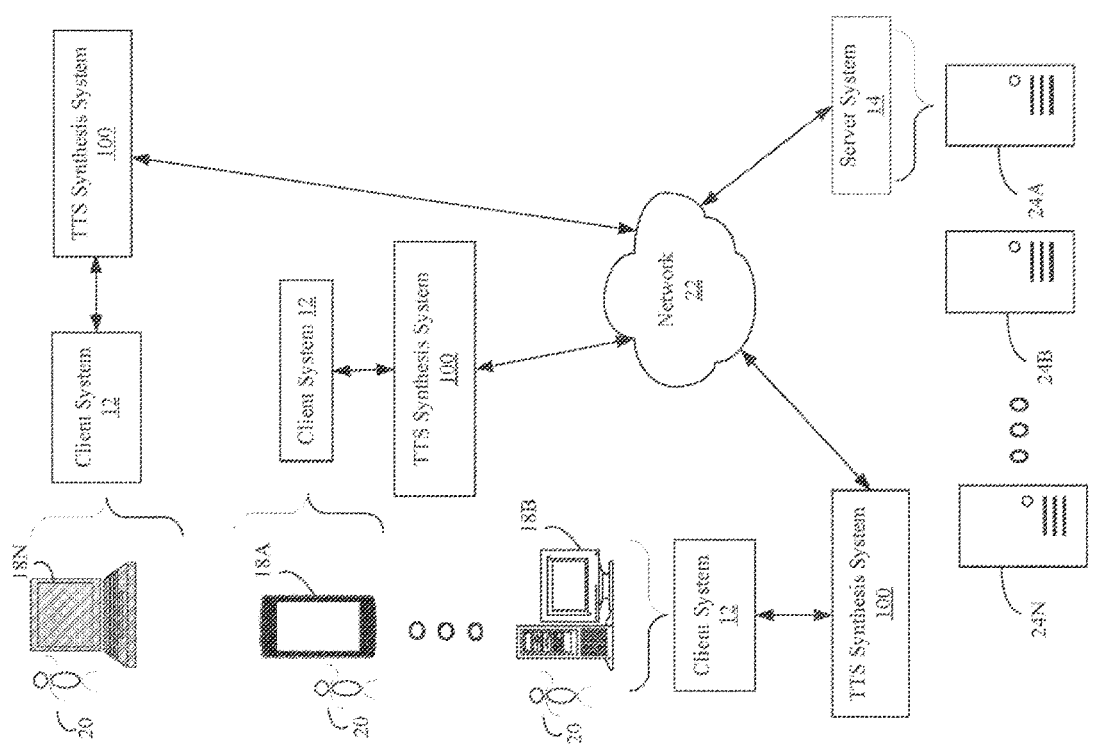
FIGS. 5A-5B are diagrammatic views of different examples of how a text-to-speech synthesis system may be deployed with respect to client systems or a server system in accordance with one or more example embodiments of the present disclosure.
Figure 5B:
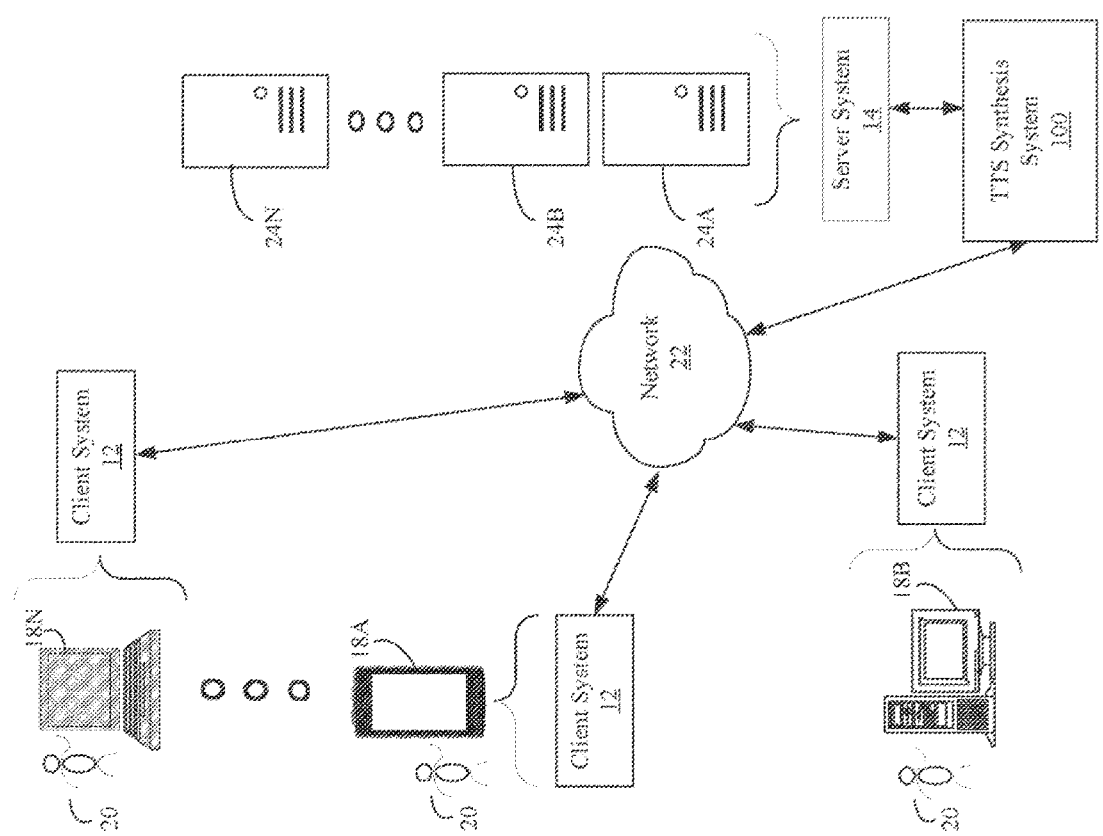

Example implementations of FIGS. 5A-5B show various examples of how the TTS synthesis system 100 may be deployed.

Referring to FIGS. 5A-5B, embodiments of a network environment are depicted. In brief overview, the network environment may include one or more client devices 18A-18N (also generally referred to as local machine(s) 18, client(s) 18, client node(s) 18, client machine(s) 18, client computer(s) 18, endpoint(s) 18, or endpoint node(s) 18) that may be in communication with one or more servers 24A-24N (also generally referred to as server node(s) 24, or remote machine(s) 24) via one or more networks 22.

Although FIGS. 5A-5B show a network 22 between the client devices 18 and the servers 24, the client devices 18 and the servers 24 may be on the same network 22. In some embodiments, there may be multiple networks 22 between the client devices 18 and the servers 24. The network 22 may be a private network, a public network, or a hybrid network.

The network 22 may be connected via wired or wireless links. Wired links may include Digital Subscriber Line (DSL), coaxial cable lines, Ethernet, fiber-optic or other links used for network infrastructure as would be understood by one of ordinary skill in the art. The wireless links may include cellular, BLUETOOTH, Wi-Fi, Worldwide Interoperability for Microwave Access (WiMAX), an infrared channel or satellite bands or other wireless networking technologies as would be understood by one of ordinary skill in the art. The wireless links may also include any cellular network standards used to communicate among mobile devices, including standards that qualify as 1G, 2G, 3G, 4G, 5G, LTE or the like. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards may include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 22 may be any type and/or form of network. The geographical scope of the network 22 may vary widely and the network 22 may be a body area network (BAN), a personal area network (PAN), a local-area network (LAN), e.g. Intranet, a metropolitan area network (MAN), a wide area network (WAN), or the Internet. The topology of the network 22 may be of any form and may include, e.g., any of the following: point-to-point, serial, bus, star, ring, mesh, or tree. The network 22 may be an overlay network which is virtual and sits on top of one or more layers of other networks. The network 22 may be of any such network topology as known to those ordinarily skilled in the art capable of supporting the operations described herein. The network 22 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 22 may be a type of a broadcast network, a telecommunications network, a data communication network, or a computer network.

In some implementations, one or more of users 20 may access the client system 12 and the TTS synthesis system 100 (e.g., using one or more of client electronic devices 18A-18N). The TTS synthesis system 100 may include one or more user interfaces, such as browsers and textual or graphical user interfaces, through which users 20 may access TTS synthesis system 100.

In FIG. 5A, the TTS synthesis system 100 may be deployed with each client system 12 of the client devices 18A, 18B, 18N (e.g., client side application). In this example, the TTS synthesis system 100 may interact directly with the client system 12 (e.g., may reside on and may be executed by each client device 18A-18N) and optionally may interact with the server system 14 via the network 22. In another example, the TTS synthesis system may be deployed with each client system 12 without being in communication with a server system 14 (e.g., no communication between TTS synthesis and server system 14 via network 22). The TTS synthesis system 100 may be an application running on each client device 18A, 18B, 18N. In some examples, the TTS synthesis system 100 may be accessed indirectly via the client system 12. In other examples, as shown in FIG. 5A, the TTS synthesis system 100 may have direct access to server system 14 via network 22. In some implementations, the client system 12 may be a standalone application, or may be an applet/application/script/extension that may interact with and/or be executed within and/or be a component of the TTS synthesis system 100. Examples of the client system 12 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of the client system 12 (which may be stored on storage devices coupled to client electronic devices 18A-18N) may be executed by one or more processors and one or more memory architectures incorporated into client electronic devices 18A-18N. In some implementations, the client system 12 may be configured to effectuate some or all of the functionality of the TTS synthesis system 100 (and vice versa).

In FIG. 5B, the TTS synthesis system 100 may be deployed with the server system 14 on one or more servers 24 (i.e., server-side application). In this example, the TTS synthesis system 100 may interact directly with the server system 14 (e.g., may reside on and may be executed by one or more servers 24) and interacts with each client system 12 via the network 22. In some examples, the TTS synthesis system 100 may be accessed indirectly via the server system 14. In other examples, as shown in FIG. 5B, the TTS synthesis system 100 may have direct access to each client system 12 via the network 22. In some implementations, the server system 14 may be a standalone application, or may be an applet/application/script/extension that may interact with and/or be executed within and/or be a component of the TTS synthesis system 100. Examples of the server system 14 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of the server system 14 (which may be stored on storage devices coupled to servers 24) may be executed by one or more processors and one or more memory architectures incorporated into servers 24. In some implementations, the server system 14 may be configured to effectuate some or all of the functionality of the TTS synthesis system 100 (and vice versa).

In some implementations, the TTS synthesis system 100 may be a purely client-side application (e.g., as shown in FIG. 5A), a purely server-side application (e.g., as shown in FIG. 5B), or a hybrid server-side/client-side application that may be cooperatively executed by one or more of the client system 12, the server system 14, and/or the TTS synthesis system 100.

Figure 6:
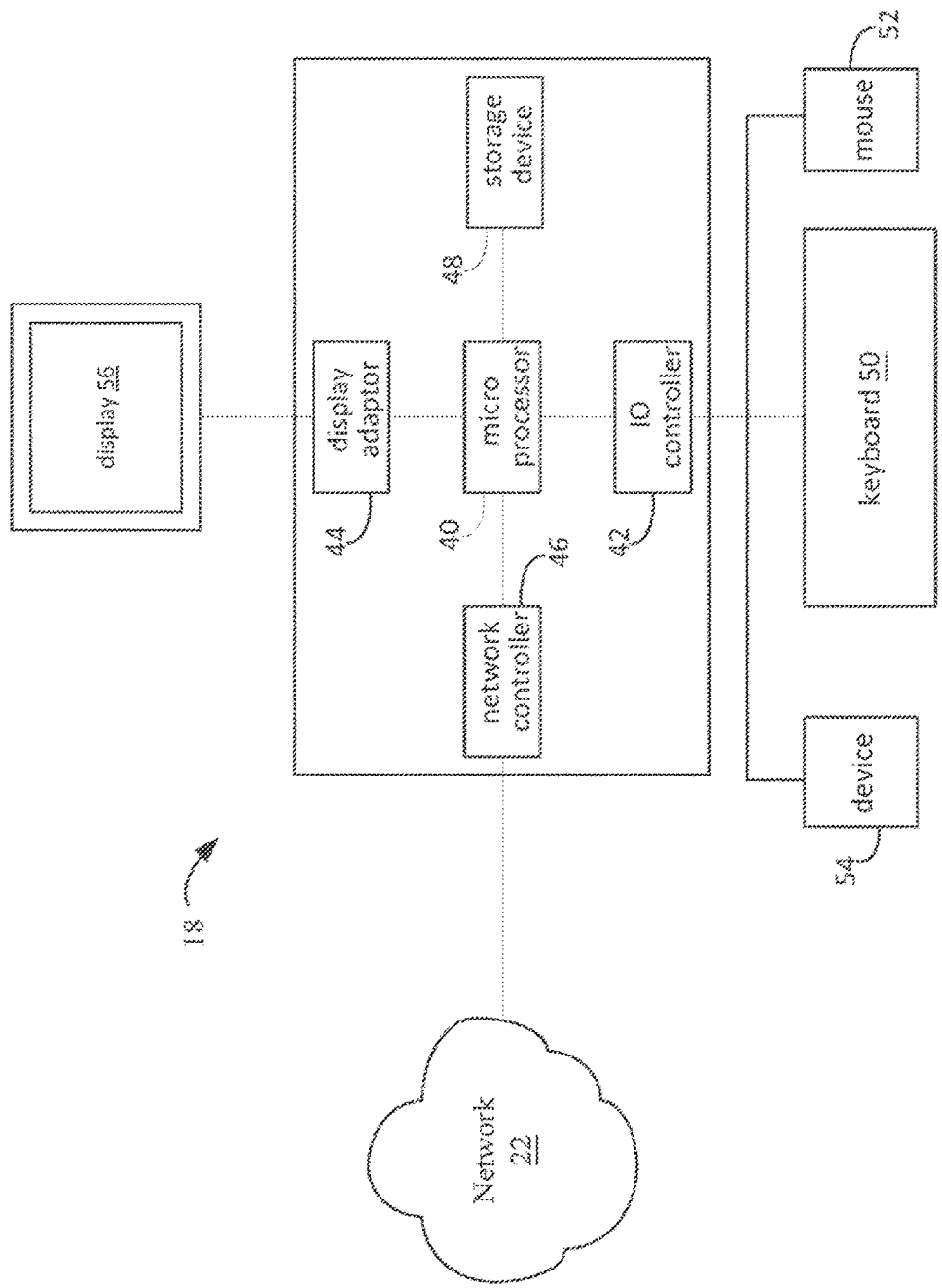
FIG. 6 is an example diagrammatic view of a client device of FIGS. 5A-5B according to one or more example embodiments of the present disclosure.

The example implementation of FIG. 6 is a diagrammatic view of an example client device 18 as shown in FIGS. 5A-5B. The example embodiment of client device 18 shown in this figure is not intended to be a limitation of this disclosure, as it is understood that other configurations may be possible. Additionally, any computing device capable of executing, in whole or in part, the TTS synthesis system 100 and/or client system 12 may be substituted for client device 18 (in whole or in part) within FIG. 6, examples of which may include but are not limited to one or more of client devices 18A-18N.

In some implementations, the client device 18 may include a processor and/or microprocessor (e.g., microprocessor 40) configured to, e.g., process data and execute code/instruction sets and subroutines. Microprocessor 40 may be coupled via a storage adaptor to the above-noted storage device(s) (e.g., storage device 48). An I/O controller (e.g., I/O controller 42) may be configured to couple microprocessor 40 with various devices, such as keyboard 50, pointing/selecting device (e.g., touchpad, touchscreen, mouse 52, etc.), custom device 54, USB ports (not shown), and printer ports. A display adaptor (e.g., display adaptor 44) may be configured to couple display 56 (e.g., touchscreen monitor(s), plasma, CRT, or LCD monitor(s), etc.) with microprocessor 40, while network controller/adaptor 46 (e.g., an Ethernet adaptor) may be configured to couple microprocessor 40 to the above-noted network 22 (e.g., the Internet or a local area network).

The client device 18 may be running any operating system such as any of the versions of the MICROSOFT® WINDOWS® operating systems, the different releases of the Unix® and Linux® operating systems, any version of the MAC® OS® for Macintosh® computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS® 2000, WINDOWS® Server 2012, WINDOWS® CE, WINDOWS® Phone, WINDOWS® XP, WINDOWS® VISTA, and WINDOWS® 7, WINDOWS® RT, and WINDOWS® 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others.

Figure 7:
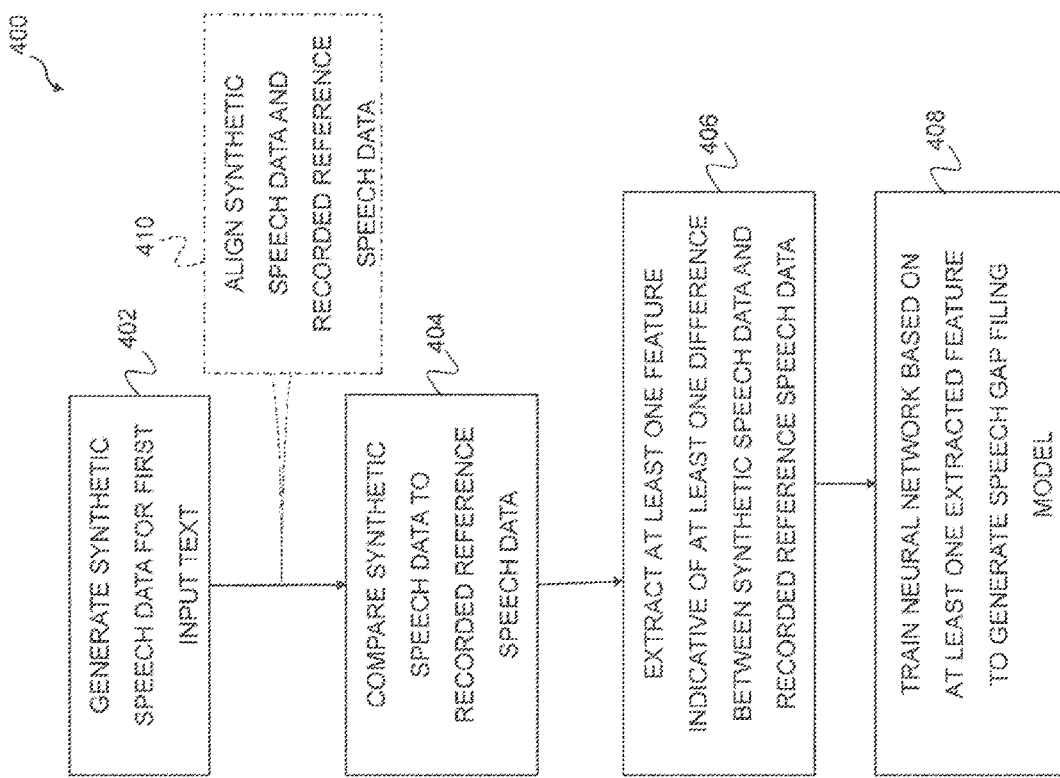
FIG. 7 is an example flow diagram of a text-to-speech synthesis involved in the training mode of the text-to-speech synthesis system, in accordance with one or more example embodiments of the present disclosure.

The example implementation of FIG. 7 shows a flowchart 400 of a text-to-speech synthesis method depicting the various example steps involved in the training mode of the system 100, in accordance with one or more embodiments of the present disclosure as discussed throughout. The various steps of the method 400 may be carried out using the components of the system 100 (singly or in any combination), as described above. The system 100 may generate 402 synthetic speech data 'D' for the first input text 'T1'. The system 100 may compare 404 the synthetic speech data 'D' to the recorded reference speech data 'R' corresponding to the first input text 'T1'. In some examples, the system 100 may align 410 the synthetic speech data and the recorded reference speech data prior to the comparison 404. The system 100 may extract 406 at least one feature 'V' (e.g., one feature or multiple features) indicative of at least one difference (e.g., one difference or multiple differences) between the synthetic speech data 'D' and the recorded reference speech data 'R' based on the comparison. The system 100 may train 408 a neural network, such as the neural network 108 in FIGS. 1-2, based on the at least one extracted feature 'V' to generate the speech gap filling model 'X'. In examples, at least one feature may be extracted (one feature or multiple features extracted) indicative of one or more differences between the synthetic speech data 'D' and the recorded reference speech data 'R' based on the comparison. This process of the speech gap filling model 'X' may be applied to one parameter or any number of multiple parameters in isolation or not in isolation. For example, one may want to improve only the pitch prediction feature capability of a speech synthesizer. One or more of the features may be extracted in different combinations.

Figure 8:
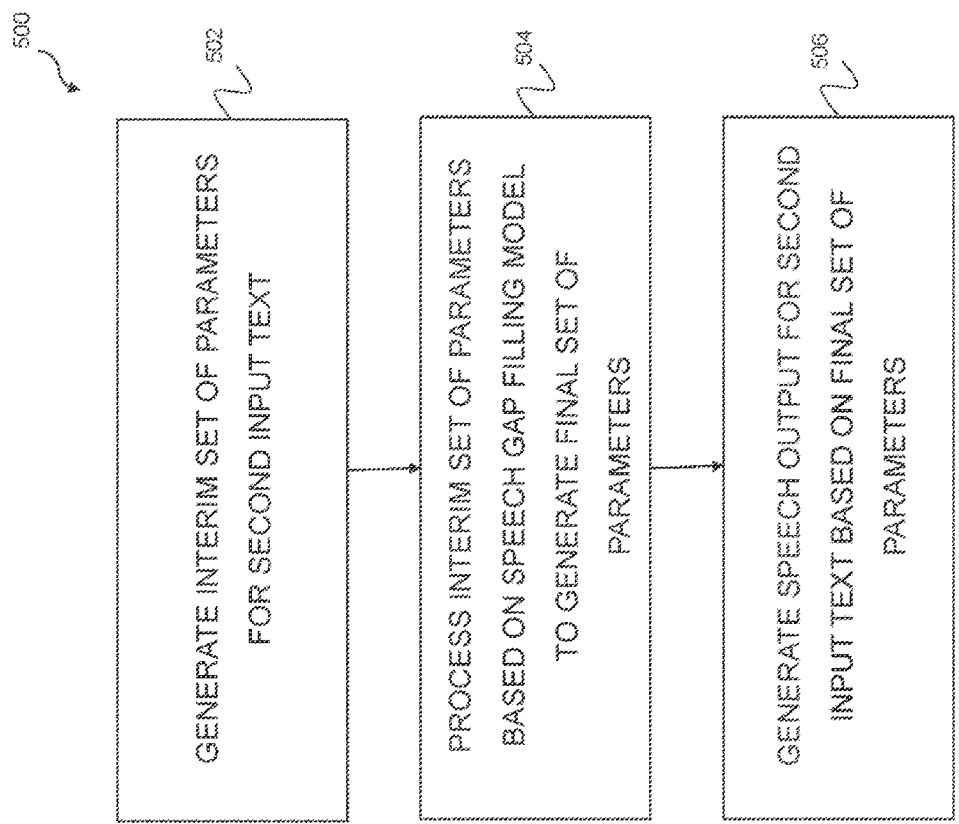
FIG. 8 is an example flow diagram of a text-to-speech synthesis involved in the synthesis mode of the text-to-speech synthesis system, in accordance with one or more embodiments of the present disclosure.

The example implementation of FIG. 8 shows a flowchart 500 of the text-to-speech synthesis method depicting the various example steps involved in the synthesis mode of the system 100, in accordance with one or more embodiments of the present disclosure. The various steps of the method 500 may be carried out using the components of the system 100 (singly or in any combination), as described above. The system 100 may generate 502 an interim set of parameters 'P1' for the second input text 'T2' using the parametric acoustic and linguistic model 'M' pre-configured for the speaker. The system 100 may process 504 the interim set of parameters 'P1' based on the speech gap filling model 'X' to generate the final set of parameters 'P2'. The system 100 may generate 506 the speech output 'S' for the second input text 'T2' based on the final set of parameters 'P2'.

The system 100, and the associated methods 400, 500, may generate high quality speech output with less negative effects compared to some conventional SPSS systems. "Negative effects," herein, may generally refer to speech output quality in typical SPSS systems (implemented with HMM, for instance) that are often reported to be "vocoded," due to the basic source/filter model assumptions. The system 100 may partially reduce these model limitations. As described above, this may be accomplished by, e.g., modeling the difference between the generated speech output and the recorded reference speech data (e.g., looking at differences in speech properties). Thereby, the system 100 may improve the efficiency and the quality of synthesized speech output as compared to conventional SPSS systems. The resulting synthesized speech output 'S', from the system 100, may be more natural than speech produced by some implementations (e.g., HMM or DNN individually).

In an example embodiment, the system 100 may utilize an HMM-text-to-speech (TTS) to generate speech output (e.g., HMM output). In this example, the system 100 may compare the HMM output with an original raw recording. The system 100 may then determine differences between an original raw recording (e.g., natural speech) and the HMM-output. Further, the system 100 may provide differences to the neural network 108 for training. This may result in improved efficiency and quality in synthesizing speech. The system 100 of the present disclosure may provide improvements in pitch, which may be achieved while avoiding deterministic models (e.g., exemplar-based models for prosody reconstruction may be based on templates). The system 100 may adopt neural network approaches that may be architected to behave as stochastic models, providing more lively behaviors than predefined sequences of models (e.g., "more lively" may mean closer alignment of speech properties between synthetic speech data and natural speech).

It may be understood that the neural network 108 may be capable of predicting a best sequence of extracted features 'V' (e.g., excitation vectors) from the generated speech gap filling model 'X' to be added to the interim set of parameters 'P1' for synthesis of the speech output 'S' by the speech engine 104. In some examples, the list of parameters may include predefined excitation vectors stored in memory beforehand as part of a parametric model. The speech gap filling model 'X' may be able to provide an adjustment of a vector index to be applied before going to the synthesis mode. Finding the adjustment of vector indices, may be seen as an optimization problem corresponding to identifying the ideal sequence of excitation vectors throughout the sentence. The ideal sequence of excitation vectors may refer to excitation vectors that minimize the difference between the synthetic signal of the synthetic speech data 'D' and the reference signal of the recorded reference speech data a used during training. The neural network 108 may only need to use indexes for that purpose, as the distances between the extracted features 'V' (e.g., excitation vectors) may be pre-calculated. This may help to make the system 100 relatively efficient and may also reduce the latency time for processing input text to generate the corresponding speech output. For the system 100, this may further contribute to improving vocoding speech output quality, reaching the potential MOS (mean opinion score) equivalent to the MOS for CELP encoded/decoded speech (as implemented in Global System for Mobile Communications (GSM) and other VoIP applications). In the context of speech synthesis, the more natural the generated speech output (e.g., to the human ear) of the synthesized voice, generally the better the MOS of the system.

Some of the example parametric TTS models (e.g., HSMM models, etc.) for which the system 100 may be implemented may include, but are not limited to, Pulse-HMM (in which source may be modeled with pulse and noise, plus vocal tract may be modeled with context dependent phone HMM and Cepstral parametrization), Glott-HMM (in which the source may be modeled with glottal flow excitation and noise, plus the vocal tract may be modeled with context dependent phone HMM and Cepstral parametrization), articulatory speech synthesizer (ASS) (in which the source may be modeled with glottal flow excitation and noise, plus the vocal tract may be modeled with fluid dynamic 3D models of the air within the oral cavity), spectral modeling synthesis (SMS) (in which the source may be modeled as noise passes through a time varying filter and vocal tract is modeled with sequence of harmonics of the pitch), etc.

The system 100 of the present disclosure may generally be applied to any type of input text for conversion to speech output. In some examples, the system 100 may be implemented in a mobile device, such as a smartphone; and in such examples, the input text may be a received message including, but not limited to, Short Message Service (SMS) messages, Instant Messaging (IM) service messages, Social Networking Service (SNS) messages, and emails. In operation, the system 100 may be used to convey information from the received message to a user by converting the text of the received message into natural sounding speech. Such a system may be implemented for reading messages, prompts, answers to questions, instructions, news, emails, and speech-to-speech translations, among other information.

The system 100 of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The system 100 may also be a component of other devices or systems that may provide speech synthesis functionality such as automated teller machines (ATMs), kiosks, global positioning systems (GPS), home appliances (such as refrigerators, ovens, etc.), vehicles (such as cars, busses, motorcycles, etc.), and/or eBook readers, for example.

The small footprint of the neural network 108, in accordance with the embodiments described herein, may enable the system 100 to be embedded in devices with limited memory and processing power capabilities. For example, the system 100 may be implemented in a portable electronic device, such as a smart phone, a personal digital assistant (PDA), a digital camera, a global position system (GPS) tracking unit, or the like. In various embodiments, the small footprint text-to-speech engine may be especially suitable for use in embedded systems that have limited memory and processing capability. However, it will be appreciated that the system may be embedded within any computing device.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computing system including one or more processors and one or more memories configured to perform operations comprising:
    comparing synthetic speech data for an input text to recorded reference speech data corresponding to the input text;
    extracting at least one feature indicative of at least one difference between the synthetic speech data and the recorded reference speech data based on, at least in part, the comparison of the synthetic speech data to the recorded reference speech data;
    generating a speech gap filling model based on, at least in part, the at least one feature extracted;
    generating a speech output based on, at least in part, the speech gap filling model;
    comparing the speech output generated for a second input text to recorded reference speech data corresponding to the second input text; and
    extracting an updated at least one feature indicative of at least one difference between the speech output generated for the second input text and the recorded reference speech data corresponding to the second input text based on, at least in part, the comparison of the speech output for the second input text to the recorded reference speech data corresponding to the second input text.

2. The computing system of claim 1, wherein generating the speech output comprises:
    generating an interim set of parameters;
    processing the interim set of parameters based on, at least in part, the speech gap filling model to generate a final set of parameters; and
    generating the speech output based on, at least in part, the final set of parameters.

3. The computing system of claim 1, wherein the synthetic speech data generated is based on, at least in part, at least one of a parametric acoustic model and a linguistic model pre-configured for a speaker.

4. The computing system of claim 1, wherein the synthetic speech data generated is further based on, at least in part, the recorded reference speech data pre-recorded by a speaker.

5. The computing system of claim 1 further comprising aligning the synthetic speech data and the recorded reference speech data preceding the comparison.

6. The computing system of claim 5, wherein aligning the synthetic speech data and the recorded reference speech data comprises implementing one or more of pitch shifting, time normalization, and time alignment between the synthetic speech data and the recorded reference speech data.

7. The computing system of claim 1 further comprising training a neural network based on, at least in part, the at least one feature to generate the speech gap filling model.

8. The computing system of claim 1 further comprising updating the speech gap filling model based on, at least in part, the updated at least one feature.

9. A computer-implemented method, comprising:
    comparing synthetic speech data for an input text to recorded reference speech data corresponding to the input text;
    extracting at least one feature indicative of at least one difference between the synthetic speech data and the recorded reference speech data based on, at least in part, the comparison of the synthetic speech data to the recorded reference speech data;
    generating a speech gap filling model based on, at least in part, the at least one feature extracted; and
    generating a speech output based on, at least in part, the speech gap filling model;
    comparing the speech output generated for a second input text to recorded reference speech data corresponding to the second input text; and
    extracting an updated at least one feature indicative of at least one difference between the speech output generated for the second input text and the recorded reference speech data corresponding to the second input text based on, at least in part, the comparison of the speech output for the second input text to the recorded reference speech data corresponding to the second input text.

10. The computer-implemented method of claim 9, wherein generating the speech output comprises:
    generating an interim set of parameters;
    processing the interim set of parameters based on, at least in part, the speech gap filling model to generate a final set of parameters; and
    generating the speech output based on, at least in part, the final set of parameters.

11. The computer-implemented method of claim 9, wherein the synthetic speech data generated is based on, at least in part, at least one of a parametric acoustic model and a linguistic model pre-configured for a speaker.

12. The computer-implemented method of claim 9, wherein the synthetic speech data generated is further based on, at least in part, the recorded reference speech data pre-recorded by a speaker.

13. The computer-implemented method of claim 9 further comprising aligning the synthetic speech data and the recorded reference speech data preceding the comparison.

14. The computer-implemented method of claim 13, wherein aligning the synthetic speech data and the recorded reference speech data comprises implementing one or more of pitch shifting, time normalization, and time alignment between the synthetic speech data and the recorded reference speech data.

15. The computer-implemented method of claim 9 further comprising training a neural network based on, at least in part, the at least one feature to generate the speech gap filling model.

16. The computer-implemented method of claim 9 further comprising updating the speech gap filling model based on, at least in part, the updated at least one feature.

17. A computer program product residing on a computer readable storage medium having a plurality of instructions stored thereon which, when executed across one or more processors, causes at least a portion of the one or more processors to perform operations comprising:

comparing synthetic speech data for an input text to recorded reference speech data corresponding to the input text;

extracting at least one feature indicative of at least one difference between the synthetic speech data and the recorded reference speech data based on, at least in part, the comparison of the synthetic speech data to the recorded reference speech data;

generating a speech gap filling model based on, at least in part, the at least one feature extracted;

generating a speech output based on, at least in part, the speech gap filling model;

comparing the speech output generated for a second input text to recorded reference speech data corresponding to the second input text; and extracting an updated at least one feature indicative of at least one difference between the speech output generated for the second input text and the recorded reference speech data corresponding to the second input text based on, at least in part, the comparison of the speech output for the second input text to the recorded reference speech data corresponding to the second input text.

18. The computer program product of claim 17, wherein generating the speech output comprises:

generating an interim set of parameters;

processing the interim set of parameters based on, at least in part, the speech gap filling model to generate a final set of parameters; and generating the speech output based on, at least in part, the final set of parameters.

19. The computer program product of claim 17, wherein the synthetic speech data generated is based on, at least in part, at least one of a parametric acoustic model and a linguistic model pre-configured for a speaker.

20. The computer program product of claim 17, wherein the synthetic speech data generated is further based on, at least in part, the recorded reference speech data pre-recorded by a speaker.

21. The computer program product of claim 17 further comprising aligning the synthetic speech data and the recorded reference speech data preceding the comparison.

22. The computer program product of claim 21, wherein aligning the synthetic speech data and the recorded reference speech data comprises implementing one or more of pitch shifting, time normalization, and time alignment between the synthetic speech data and the recorded reference speech data.

23. The computer program product of claim 17 further comprising training a neural network based on, at least in part, the at least one feature to generate the speech gap filling model.

24. The computer program product of claim 17 further comprising updating the speech gap filling model based on, at least in part, the updated at least one feature.

* * * * *